United States Patent [19]

Bernhardt

[11] Patent Number: 4,949,334
[45] Date of Patent: Aug. 14, 1990

[54] PROTECTED INFORMATION TRANSFER SYSTEM

[75] Inventor: Keith L. Bernhardt, Raleigh, N.C.

[73] Assignee: Alcatel NA, Inc., Hickory, N.C.

[21] Appl. No.: 341,551

[22] Filed: Apr. 21, 1989

[51] Int. Cl.$^5$ ............................................. H04J 3/08
[52] U.S. Cl. ..................................... 370/55; 370/85.1
[58] Field of Search ................. 370/85, 100, 108, 55, 370/85.1, 100.1

[56] References Cited

U.S. PATENT DOCUMENTS

| | | | |
|---|---|---|---|
| 4,393,492 | 7/1983 | Bishop | 370/55 |
| 4,468,767 | 8/1984 | Warren et al. | 370/55 |
| 4,514,841 | 4/1985 | Sem-Sandberg | 370/55 |

Primary Examiner—Douglas W. Olms
Assistant Examiner—Christopher O. Edwards
Attorney, Agent, or Firm—Peter C. Van Der Sluys

[57] ABSTRACT

An add/drop interface is connected in series with a data bus and is constructed for receiving an add/drop module. The add/drop interface includes a data selection multiplexer which receives through data from the data bus and add/drop from the module and selects the proper output data in response to a signal received from a controller in said interface. The controller provides a signal to drive the data selection multiplexer to select the add/drop data only after all transient signals resulting from module connection have dissipated. The controller also provides error checking so that the through data is selected if errors are detected. Timing circuitry in the interface maintains the correct phase relationship between through data and add/drop data.

11 Claims, 2 Drawing Sheets

PROTECTED INFORMATION TRANSFER SYSTEM

BACKGROUND OF THE INVENTION

1. Field of the Invention

This invention relates to systems for transferring data onto a data bus and reading data from a data bus and, more particularly, to such information transfer systems which protect the data bus and prevent the transfer of erroneous information.

2. Description of the Prior Art

Typically, information being carried on a data bus is either read or updated by directly connecting an add/drop module to the data bus at one of many module receiving points. In these systems, data is received ("dropped") from the data bus by reading the particular information directly from the bus through a bus receiver or amplifier. In order to transmit data or add data to the bus, a tri-state bus driver is typically employed at each module receiving location In operation, the tri-state bus drivers are disabled by being placed in a high impedance state during the time slots when no data is to be transmitted onto the data bus. In order to control the proper switching of the tri-state bus drivers, a driver enable/disable control circuit is required. Whenever data is to be transmitted onto the data bus, the tri-state bus drivers must be enabled at the precisely desired time slot in order to allow the data from the add/drop module to be properly transmitted onto the data bus.

In using such prior art systems, problems are typically encountered primarily due to the need for tri-state bus drivers. These problems include: timing problems resulting from the requirement that only one tri-state bus driver be enabled at any one time; a relatively high failure rate of tri-state bus drivers; and corruption of the data on the data bus often occurring due to the requisite connection and disconnection of add/drop modules to the data bus.

Before the add/drop module can add or transmit data onto the data bus, the particular tri-state bus driver must be enabled. This timing is critical, if the tri-state bus driver is to be capable of adding data to the data bus during a precisely timed time slot. In addition, care must be exercised to assure that only one tri-state bus driver is enabled at any one time, since allowing more than one tri-state bus driver to be enabled simultaneously can damage the tri-state bus drivers and can cause data errors.

In order to prevent more than one tri-state bus driver from being enabled at any one time, these prior art systems are operated with a sufficient timing margin between time slots, in order to assure that all tri-state bus drivers achieve the high impedance state before any other tri-state bus driver is enabled in order to allow data transmission onto the bus.

In addition to these drawbacks, these prior art systems also suffer from the inability of preventing corruption of data on the data bus caused by bus driver failure. When a tri-state bus driver fails, the failure mode is often a short circuit to a voltage supply rail which results in the corruption of data on the data bus. Furthermore, a failure in the tri-state bus driver enable circuit when an add/drop module is present can corrupt the data by allowing data from the add/drop module to be transmitted onto the data bus continuously.

A further problem inherent in these prior art systems is the inability of the add/drop module to be connected or disconnected to the data bus without guaranteeing that the data will not be corrupted. Often, transient conditions caused by connecting or disconnecting the additional load to the data bus will cause the signal level on the data bus to change. These changes in the signal level can be large enough to be interpreted as data, thereby resulting in data corruption. It is essential that the tri-state bus driver be disabled when the add/drop module is being connected to the bus.

SUMMARY OF THE INVENTION

It is a principal object of the present invention to provide an information transfer system, for adding or reading data to or from a data bus, which protects the data bus from being corrupted.

Another object of the present invention is to provide a protected information transfer system which eliminates dependency upon the timing of a tri-state bus driver enable circuit.

Another object of the present invention is to provide a protected information transfer system which is not sensitive to failure of tri-state bus drivers or the enable circuitry associated therewith.

A further object of the present invention is to provide a protected information transfer system for data buses which eliminates the sensitivity of the data bus to the connection or disconnection of add/drop modules.

Another object of the present invention is to provide a protected information transfer system for data buses which completely eliminates the need for tri-state bus drivers to attain the desired data transfer.

The present invention achieves the above objects and overcomes the prior art shortcomings by providing a plurality of add/drop interface circuits, each of which are connected in series with a data bus and are constructed for interconnection with an add/drop module. Furthermore, each add/drop interface incorporates control means for selecting the data to be outputted from the interface and for assuring that the output data has the proper timing. In addition, any data added to the data bus is also monitored and added in the precisely desired timed slot.

The add/drop interface of the present invention also includes a filter means which delays connection of an add/drop module to the data bus to prevent any transient conditions from affecting the data bus. In this way, transient conditions often caused by the connection or disconnection of any add/drop module are prevented from affecting the data bus.

DESCRIPTION OF THE DRAWINGS

For a fuller understanding of the nature and objects of the present invention, reference should be made to the following detailed description taken in connection with the accompanying drawings in which.

DETAILED DESCRIPTION OF THE PREFERRED EMBODIMENT

Figure 1:
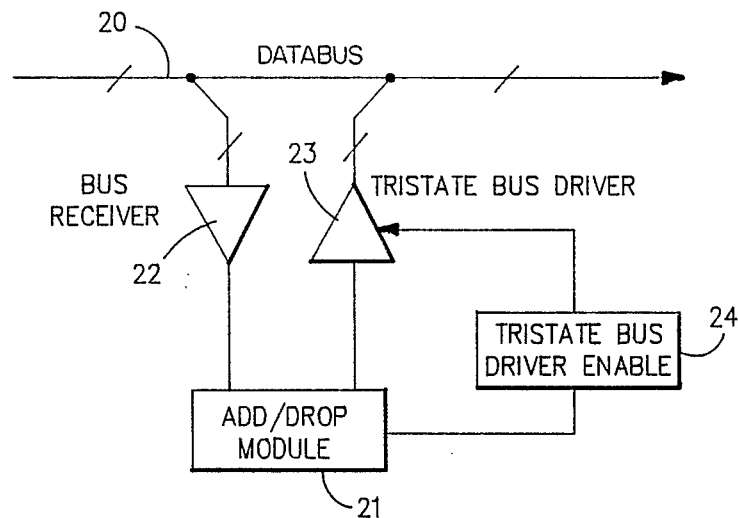
FIGURE 1 is a circuit diagram showing the conventional prior art construction for transferring information to and from a data bus.

In order to best understand the unique advantages attained by the protected information transfer system of the present invention, a conventional prior art system is shown in FIG. 1. As shown therein, a single add/drop module 21 is directly connected to a data bus 20 through a bus receiver 22 and a tri-state bus driver 23. Bus receiver 22 communicates with the add/drop module 21 connected thereto to read information from the data bus when activated. Tri-state bus driver 23 is used to transfer information from add/drop module 21 to data bus 20, when enabled.

In order to prevent information from being erroneously added to data bus 20 from add/drop module 21, this prior art system requires a tri-state bus driver enable/disable circuit 24, which is connected between add/drop module 21 and tri-state bus driver 23. When the tri-state bus driver is to be disabled, the enable/disable circuit places tri-state bus driver 23 in a high impedance state, thereby isolating the module from the data bus and preventing information from being transmitted from module 21 to data bus 20.

When information is to be added from module 21 to data bus 20, tri-state bus driver enable/disable circuit 24 must enable tri-state bus driver 23 during a precisely desired time in order to assure that the information is transferred from module 21 to a precise time slot on data bus 20. In addition, at the precise time the information has been fully transferred, enable/disable circuit 24 must disable tri-state bus driver 23 by returning the bus driver to its high impedance state.

As is apparent to one of ordinary skill in the art, the prior art system shown in FIG. 1 represents one connection of a plurality of connections used to add and read information from a typical data bus. Consequently, as detailed above, the difficulty typically encountered with such prior art systems is substantial due to the plurality of tri-state bus drivers being employed and the fact that the timing of each of these tri-state bus drivers must be carefully controlled. Consequently, inherent restrictions are imposed on the system, rendering the entire information transfer system susceptible to all of the difficulties and drawbacks detailed above.

Figure 2:
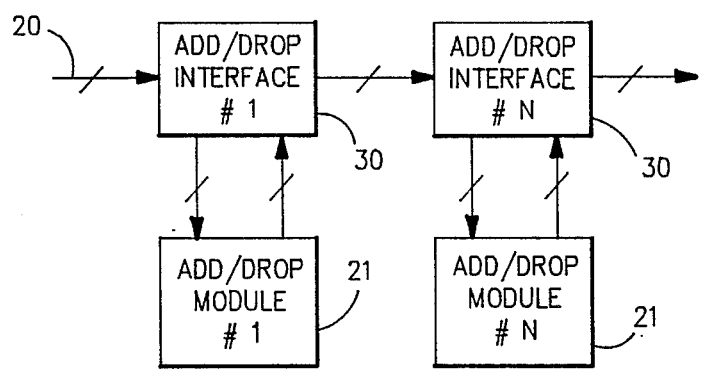
FIG. 2 is a circuit diagram showing the protected information transfer system of the present invention.

By employing the present invention, all of the prior art problems resulting from the use of tri-state bus drivers are completely eliminated. As shown in FIG. 2, the present invention eliminates the need for tri-state bus drivers by connecting an add/drop interface 30 directly in series with data bus 20 for each add/drop module connection point desired. Each add/drop module 21 is connected directly to an add/drop interface 30. In this way, the protected information transfer system of the present invention is attained.

In order to provide the desired protected information transfer system, each add/drop interface incorporates the necessary circuitry to protect the data bus 20 at each connection point for an add/drop module 21. Each add/drop interface 30 comprises the requisite circuitry to eliminate the need for tri-state bus drivers, thereby providing data bus 20 with protection from driver failure. The circuitry also prevents connections or disconnections of modules to or from the data bus from corrupting the data on the bus.

Figure 3:
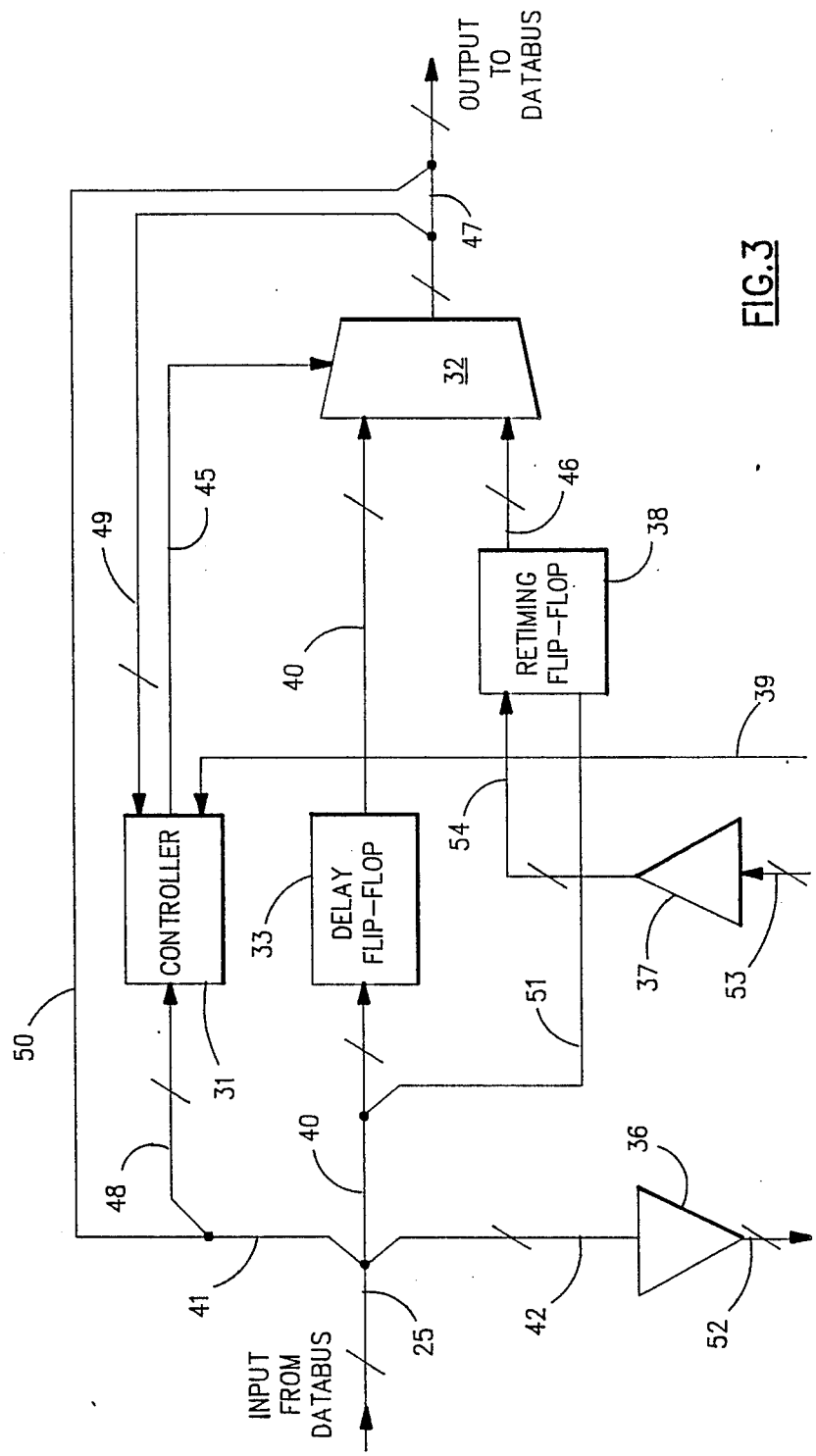
FIG. 3 is a detailed circuit block diagram showing the add/drop interface employed in the protected information transfer system of the present invention.

In order to best understand the operation of add/drop interface 30 of this invention, reference should be made to FIG. 3, wherein the circuit construction of add/drop interface 30 is shown in detail. By referring to FIG. 3 along with the following detailed disclosure, the operation and construction of the protected information transfer system of the present invention can best be understood.

Add/drop interface 30 of the present invention incorporates three principal components, a multiplexer controller 31, a data multiplexer 32 and a delay flip-flop 33. In addition, add/drop interface 30 also incorporates a line receiver 36, a line driver 37, and a retiming flip-flop 38.

In the preferred embodiment, add/drop interface 30 is connected in series with the data bus with an input 25 from the data bus to interface 30 being connected to lines 40, 41 and 42 of interface 30. Line 40 represents a through data path, since it carries the data from the data bus through delay flip-flop 33 to data multiplexer 32. Line 41 transmits data to multiplexer controller 31, via line 48, while controller 31 drives data multiplexer 32 by transmitting control signals along line 45.

Preferably, the clock signal from the data bus is separated from line 41 and is transmitted on line 50 directly to an interface output 47 which is connected to the data bus. The same clock signal is also transmitted on line 51 to retiming flip-flop 38. In this way, interface 30 assures that the information transmitted as the output to the data bus has the proper timing.

In order to add information to or read information from the data bus, an add/drop module is connected to line driver 37 and line receiver 36. In addition, whenever an add/drop module is connected to interface 30, a module present signal is delivered from add/drop module 21 to multiplexer controller 31 on line 39. In this way, any information to be read by the add/drop module is transmitted on line 42, through line receiver 36 to the add/drop module on line 52, while any information to be added to the data bus is transmitted from the add/drop module to line driver 37 on line 53, and then to retiming flip-flop 38 on line 54.

As clearly shown in FIG. 3, data multiplexer 32 receives two inputs, one from delay flip-flop 33 on line 40, which represents the through data path. The second input is from retiming flip-flop 38 on line 46, which represents the add/drop data path.

The function performed by data multiplexer 32 is to select which data path, the through data or the add/drop data, is to be presented to the output 47 of the add/drop interface 30 for delivery to the data bus. This path selection by the data multiplexer 32 is controlled by the multiplexer controller 31, based upon the several factors detailed below.

Delay flip-flop 33 provides the necessary delay in the through data path to equalize the delay in the add/drop data path to within one data clock period. As a result, this delay insures that the phase of the frames arriving at both inputs to data multiplexer 32 are the same.

In addition to controlling data multiplexer 32, multiplexer controller 31 provides error monitoring in order to protect against failures. This error monitoring is performed by comparing an error checking data pattern which is carried on the data bus at both the input 25 and output 47 of the add/drop interface. In order to provide this error checking, multiplexer controller 31 monitors the data bus input along lines 41 and 48, while monitoring the output to the data bus on line 49. The specific error checking data pattern to be used is not important as long as the pattern is present and the timing of the pattern is known to the multiplexer controller 31.

In operation, multiplexer controller 31 checks the pattern received on line 48 from the data bus input 25 with the pattern received on line 49 from the data bus output 47. If the error checking pattern does not match, an error is declared. In addition, an error flag is set based upon a predetermined number of errors declared Multiplexer controller 31 incorporates an instruction set which establishes the predetermined number based upon the type of data being transported on the bus.

Another feature provided by the information transfer system of this invention is the incorporation of means in multiplexer controller 31 to assure that the data being transmitted on the data bus is not corrupted by transients created by the connection or disconnection of the add/drop module. In the preferred embodiment, when the add/drop module is connected and the module present signal changes from NOT SET to SET, the module present signal transmitted to multiplexer controller 31 is filtered or delayed for eight frames before multiplexer controller 31 sets the module present flag. In this way, transient conditions caused by the connection of the add/drop module are dissipated before the data multiplexer 32 connects the add/drop data path to the data bus. In the case of disconnection of the add/drop module, the multiplexer controller 31 can be provisioned prior to disconnection so that the data multiplexer 32 switches to the through data before the module is disconnected.

In operation, multiplexer controller 31 normally drives the data multiplexer 32 to select and transmit the through data being received on line 40. In this way, the data being received by add/drop interface 30 from the data bus is transmitted through delay flip/flop 33 to data multiplexer 32 and then to output 47 from data multiplexer 32 for transmission to the data bus as the output of add/drop interface 30.

Alternatively, multiplexer controller 31 drives data multiplexer 32 to select the add/drop data path, being received by data multiplexer 32 on line 46, when a signal is received by multiplexer controller 31 on line 39, representing a module present signal, and the module present flag has been set without any error flag being set. When these conditions are met, data multiplexer 32 receives the data from line 46 representing the add/drop data path and delivers the data to output 47 of add/drop interface 30.

As discussed above, retiming flip-flop 38 is employed to assure that the data transmitted to line 46 has the proper timing for delivery to the data bus. To assure maintenance of this timing, line 51 delivers the clock signal from the data bus to retiming flip-flop 38, thereby assuring that the output of flip-flop 38 is properly timed.

Although the add/drop interface of the present invention can be employed in a variety of data bus applications, the present invention is directly applicable to add/drop multiplexers used in telecommunications networks. In particular, telecommunication signals typically employ a time division multiplex frame format, such as SONET OC-N. These signals can easily be transmitted on the protected add/drop data bus of the present invention. In particular, the framing pattern incorporated into these signals is easily used as the error checking pattern, and a frame strobe signal derived from the framing pattern is easily employed to identify the framing pattern. Furthermore, the serial bit stream of the telecommunications signal could be easily converted to a parallel format in the interface, thereby reducing the clock rate required in the interface.

By employing the add/drop interface of the present invention, the data bus is protected against failure, as well as being protected against data corruption often occurring when an add/drop module is connected or disconnected to the data bus. In addition, the present invention allows add/drop multiplexers to be constructed with an internal data bus having access to all of the information content of the time division multiplex frame at all points along the data bus. In this way, interfaced systems having varying and mixed information bandwidths can be connected to the data bus.

It will thus be seen that the objects set forth above, and those made apparent from the preceding description, are efficiently attained and, since certain changes may be made in the above circuit without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention, which as a matter of language, might be said to fall therebetween.

Having described my invention, what I claim as new and desire to secure by Letters Patent is:

1. An information transfer system, adapted for use with add/drop modules for reading data from a data bus and/or adding data to a data bus, said system including at least one add/drop interface connected in series with the data bus and constructed for connection to an add/drop module, said interface comprising:

a data input for connection to the data bus;

a data output for connection to the data bus;

means for connecting to an add/drop module, said means including a module output connected to the data input for providing data from the data bus to the add/drop module, a module input for receiving data from the add/drop module, and signal means for receiving a module present signal from the add/drop module;

multiplexing means having a first input connected to the data input for receiving data from the data bus and a second input connected to the module input for receiving data from the add/drop module, said multiplexing means being responsive to an output control signal for selecting the data on one of said first and second inputs, and for transmitting said selected data to the data output for transmission on the data bus; and control means connected to the means for connecting to an add/drop module for receiving the module present signal therefrom and for providing said output control signal to said multiplexing means in response to said module present signal, whereby said multiplexing means transmits the data received from the add/drop module when a module is present, and transmits the data received from the data bus when an add/drop module is not present.

2. An information transfer system as described in claim 1, additionally comprising delay means disposed between the data input and the first input for delaying the data by an amount corresponding to a delay experienced by data passing through the add/drop module.

3. An information transfer system as described in claim 2, wherein the delay means comprises a flip-flop.

4. An information transfer system as described in claim 2, additionally comprising retiming means disposed between the module input and the second input, said retiming means connected to the data input for receiving a clock signal from the data bus for retiming the data received from the add/drop module, so that the data transmitted to the data output has the proper system timing.

5. An information transfer system as described in claim 4, wherein the retiming means comprises a flip-flop responsive to a clock signal from the data bus.

6. An information transfer system, adapted for use with add/drop modules for reading data from a data bus and/or adding data to a data bus, said system including at least one add/drop interface connected in series with the data bus and constructed for connection to an add/drop module, said interface comprising:

a data input for connection to the data bus;

a data output for connection to the data bus;

means for connecting to an add/drop module, said means including a module output connected to the data input for providing data from the data bus to the add/drop module, a module input for receiving data from the add/drop module, and signal means for receiving a module present signal from the add/drop module;

multiplexing means having a first input connected to the data input for receiving data from the data bus and a second input connected to the module input for receiving data from the add/drop module, said multiplexing means being responsive to an output control signal for selecting the data on one of said first and second inputs, and for transmitting said selected data to the data output for transmission on the data bus; and control means connected to the means for connecting to an add/drop module for receiving the module present signal therefrom and for providing said output control signal to said multiplexing means in response to said module present signal, said control means includes an input connected to the data input for receiving a signal pattern from the data bus, another input connected to the data output for receiving said signal pattern, means for comparing said received signal patterns and detecting data errors, and means responsive to data errors for causing the output control signal to drive the multiplexing means to connect the first input to the data output, whereby said multiplexing means transmits the data received from the add/drop module when a module is present, and transmits the data received from the data bus when an add/drop module is not present or data errors are detected.

7. An information transfer system as described in claim 6, wherein said control means additionally includes means for counting the number of data errors detected and preventing the output control signal from responding to the data errors until a predetermined number of data errors are detected.

8. An information transfer system as described in claim 6, adapted for use in a telecommunications network, wherein the signal pattern used for the error detecting comprises a framing pattern.

9. An information transfer system as described in claim 1, wherein said module input additionally comprises a line receiver.

10. An information transfer system as described in claim 1, wherein said module input additionally comprises a line driver.

11. An information transfer system, adapted for use with add/drop modules for reading data from a data bus and/or adding data to a data bus, said system including at least one add/drop interface connected in series with the data bus and constructed for connection to an add/drop module, said interface comprising:

a data input for connection to the data bus;

a data output for connection to the data bus;

means for connecting to an add/drop module, said means including a module output connected to the data input for providing data from the data bus to the add/drop module, a module input for receiving data from the add/drop module, and signal means for receiving a module present signal from the add/drop module;

multiplexing means having a first input connected to the data input for receiving data from the data bus and a second input connected to the module input for receiving data from the add/drop module, said multiplexing means being responsive to an output control signal for selecting the data on one of said first and second inputs, and for transmitting said selected data to the data output for transmission on the data bus; and control means connected to the means for connecting to an add/drop module for receiving the module present signal therefrom and for providing said output control signal to said multiplexing means in response to said module present signal, whereby said multiplexing means transmits the data received from the add/drop module when a module is present, and transmits the data received from the data bus when an add/drop module is not present, said control means further including means for delaying the provision of the output control signal in response to the module present signal for a predetermined period of time, whereby transients created by the connection of the add/drop module may dissipate before the multiplexing means switches to the second input and transmits data from the add/drop module.

* * * * *